(12) United States Patent  (10) Patent No.: US 7,552,577 B2
Strosser  (45) Date of Patent: Jun. 30, 2009

(54) HEADER FLOTATION CALIBRATION SYSTEM

(75) Inventor: Richard P. Strosser, Akron, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/238,617

(22) Filed: Sep. 29, 2005

(65) Prior Publication Data

US 2007/0068129 A1 Mar. 29, 2007

(51) Int. Cl.
 *A01D 41/127* (2006.01)
(52) U.S. Cl. .................................. 56/10.2 R
(58) Field of Classification Search ............... 56/10.2 E, 56/10.2 A, 10.2 D, 10.2 R; 73/1.01; 701/50; 172/1, 2, 3, 4
See application file for complete search history.

(56) References Cited

U.S. PATENT DOCUMENTS

| | | | |
|---|---|---|---|
| 4,612,757 A | 9/1986 | Halls et al. | |
| 4,622,803 A | 11/1986 | Lech | |
| 5,309,700 A | 5/1994 | Winkels et al. | |
| 5,327,709 A * | 7/1994 | Webb ......................... | 56/15.8 |
| 5,359,836 A | 11/1994 | Zeuner et al. | |
| 5,455,769 A | 10/1995 | Panoushek et al. | |
| 5,463,854 A | 11/1995 | Chmielewski et al. | |
| 5,465,560 A | 11/1995 | Panoushek et al. | |
| 5,469,694 A | 11/1995 | Panoushek et al. | |
| 5,471,823 A | 12/1995 | Panoushek et al. | |
| 5,471,825 A | 12/1995 | Panoushek et al. | |
| 5,473,870 A | 12/1995 | Panoushek et al. | |
| 5,535,577 A | 7/1996 | Chmielewski et al. | |
| 5,577,373 A | 11/1996 | Panoushek et al. | |
| 5,613,352 A | 3/1997 | Panoushek et al. | |
| 5,704,200 A | 1/1998 | Chmielewski et al. | |
| 6,813,873 B2 * | 11/2004 | Allworden et al. ......... | 56/10.2 E |
| 6,826,894 B2 * | 12/2004 | Thiemann et al. ......... | 56/10.2 E |
| 6,883,299 B1 * | 4/2005 | Gramm ................... | 56/10.2 E |
| 7,025,148 B2 * | 4/2006 | Hansen ......................... | 172/2 |
| 7,168,229 B1 * | 1/2007 | Hoffman et al. .............. | 56/208 |
| 2002/0069628 A1 * | 6/2002 | Metzger .................. | 56/10.2 E |
| 2002/0178710 A1 * | 12/2002 | Engelstad et al. ......... | 56/10.2 E |
| 2003/0140609 A1 * | 7/2003 | Beaujot ................... | 56/10.2 E |
| 2006/0254232 A1 * | 11/2006 | Bomleny et al. ......... | 56/10.2 E |
| 2006/0254233 A1 * | 11/2006 | Bomleny ................. | 56/10.2 E |

* cited by examiner

*Primary Examiner*—Thomas B Will
*Assistant Examiner*—Jamie L McGowan
(74) *Attorney, Agent, or Firm*—Patrick M. Sheldrake; John William Stader; Michael G. Harms

(57) ABSTRACT

A system for calibrating a header flotation system of an agricultural vehicle having a header is provided that includes a control circuit configured to monitor the height of the header and to calculate an upforce that will maintain a desired downforce of the header against the ground. This calculation is based at least upon the position of the header during flotation.

9 Claims, 4 Drawing Sheets

HEADER FLOTATION CALIBRATION SYSTEM

FIELD OF THE INVENTION

This invention relates generally to agricultural vehicles having headers. More particularly, it relates to systems for suspending the headers. Even more particularly, it relates to systems for automatically adjusting header suspensions.

BACKGROUND OF THE INVENTION

Headers refer to the structure disposed at the front of an agricultural harvesting vehicle that gather growing plant matter and cut it off, typically close to ground level. These machines may include such things as combines and windrowers, for example.

For most crops, it is important that the bottom edge of the header where the crop is cut travels very close to the ground, typically on the order of 1-6 inches away from the ground. To insure that the header follows the ground at this height, skids are provided on the bottom of the header to rest gently upon the ground, and permit the header to follow the ground contours up and down as the vehicle travels through the field.

Headers are typically heavy, however, and cannot rest with their weight entirely upon the ground. If they did, this is great weight would cause the header itself to dig into the ground and scoop up earth, rocks, sticks and similar foreign matter other than the crop that should be harvested.

To prevent the header from resting entirely upon the ground and digging into the ground, it is often counterbalanced, which reduces the force exerted by the header upon the ground. As an example, the header of a windrower may weigh 500-1000 pounds. The effective downforce that permits the windrower header to glide smoothly over the ground without digging into the soil is only about 70 pounds. To counterbalance the header of a windrower, an upward force of several hundred pounds should be applied to the header.

Arrangements called "header flotation systems" have been devised to apply this upward force to headers. Traditionally, they have included a complex arrangement of elongated springs, levers, bell cranks, and similar mechanical linkages. The goal in most header flotation systems is to apply a constant upforce on the header that is independent of the actual position of the header. While this ideal is rarely achieved, it is nonetheless the ideal, and therefore elongated springs that have a relatively flat response (i.e. a constant spring force applied to the header regardless of the length to which the spring is stretched) have traditionally been preferred. These long springs take a large amount of space and require considerable adjustment, however, particularly when changing from one header to another, or when adding or removing attachments or associated implements.

To solve this problem, many manufacturers have begun to use adjustable hydraulic springs comprised of hydraulic cylinders coupled to gas charged accumulators. Whenever the header is modified, it is relatively easy for the operator to change the strength of the hydraulic spring by varying the amount of hydraulic fluid inside the accumulator and hence varying the accumulator pressure.

In these simple systems, the operator adjusts the amount of preload by manipulating an operator input device to vary the precharge on the hydraulic cylinders that function as counterbalance springs. By increasing the fluid precharge in the accumulator, a higher counterbalance force can be applied and the header will rest more gently upon the ground. By reducing the fluid precharge in the accumulator, a lower counterbalance force can be applied and the header will rest more heavily upon the ground.

In practice, the operator adjusts the hydraulic fluid precharge inside the operator cab, then climbs down from the vehicle, walks to the front of the vehicle where the header is located, and then manually raises the header to determine what the net downforce is that the header applies to the ground. This process is repeated as many times as necessary until the operator is satisfied with the net downforce.

This process is slow. Furthermore, it is inconsistent. Even further, it does not permit the header flotation system to be easily adjusted during operation in the field. This latter situation is a particular problem since headers typically gather not only plant matter, but rocks, dirt, sand, sticks, branches, and other trash matter as they travel through the field. These rocks and trash become wedged between components of the header. Further, they can be gathered by the header and deposited inside the auger chamber, or they can be fed to the middle of the header (in the case of combine harvesters) and fall underneath and around the feeder that directs the crop matter to the threshing system.

Regardless of the method by which the non-crop matter is gathered, as it accumulates it weighs the header down and adds to the ground force applied to the header against the ground. With no easy system for accommodating this non-crop matter (e.g. by removing it quickly and easily from the header, or by increasing the counterbalance force) the net effect is for the header to press harder and harder against the ground, eventually requiring the operator to stop the vehicle and either increase the counterbalance force, or clean out the header.

What is needed, therefore, is a system for quickly and easily setting the counterbalance force applied to the header, and hence setting the downforce of the header acting upon the ground. What is also needed is a system for accommodating changes in header weight due to non-crop matter such as rocks and trash gathered into the header. It is an object of this invention to provide a header flotation system that provides these benefits.

SUMMARY OF THE INVENTION

In accordance with a first aspect of the invention a header flotation system is provided that includes a hydraulic spring and an electronic control unit configured to automatically determine the net downforce of the header and to adjust the hydraulic spring to apply a counterbalancing upforce of less than the net downforce of the header.

The hydraulic spring may include a hydraulic cylinder and a gas charged accumulator coupled thereto. The header flotation system may further include a header position sensor coupled to the electronic control unit to transmit a signal indicating the position of the header to the electronic control unit. The header flotation system may also include an operator input device coupled to the electronic control unit to indicate a desired net downforce or a desired counterbalancing force. The header flotation system may also include a hydraulic valve fluidly coupled between a hydraulic fluid pump and the accumulator, wherein the valve is also coupled to the electronic control unit, and wherein the electronic control unit is configured to automatically set the net downforce of the header by varying the fluid precharge of the accumulator. The electronic control unit may be configured to automatically increase the precharge on the accumulator until the header moves and the net downforce is reduced to zero, and then to reduce the precharge on the accumulator until the appropriate net downforce greater than zero downforce. The electronic control unit may be configured to determine the appropriate net downforce by reading the operator input device. The electronic control unit may also be configured to determine the desired upforce to be applied by the hydraulic spring by reading the operator input device. The operator input device may be manipulated by the operator to generate a signal indicative of the appropriate net downforce applied by the header to the ground or it may be manipulated by the operator to generate a signal indicating the desired upforce on the header to be applied by the hydraulic spring.

DETAILED DESCRIPTION OF THE PREFERRED EMBODIMENTS

In the discussion below, "forward", "front", "reverse", "rear", "aft", "after", "ahead", "behind", "in front of", "left", "right", "lateral", "side", "side-by-side" and their variants, refer to front, rear, left, and right as perceived by the operator when standing directly behind the vehicle and facing in the direction of forward vehicle travel.

Furthermore, the various components shown or described herein for any specific application of this invention can be varied or altered as anticipated by this invention. The practice of a specific application of any element may already be widely known or used in the art by persons skilled in the art. Each will therefore not be discussed in significant detail herein.

Figure 1:
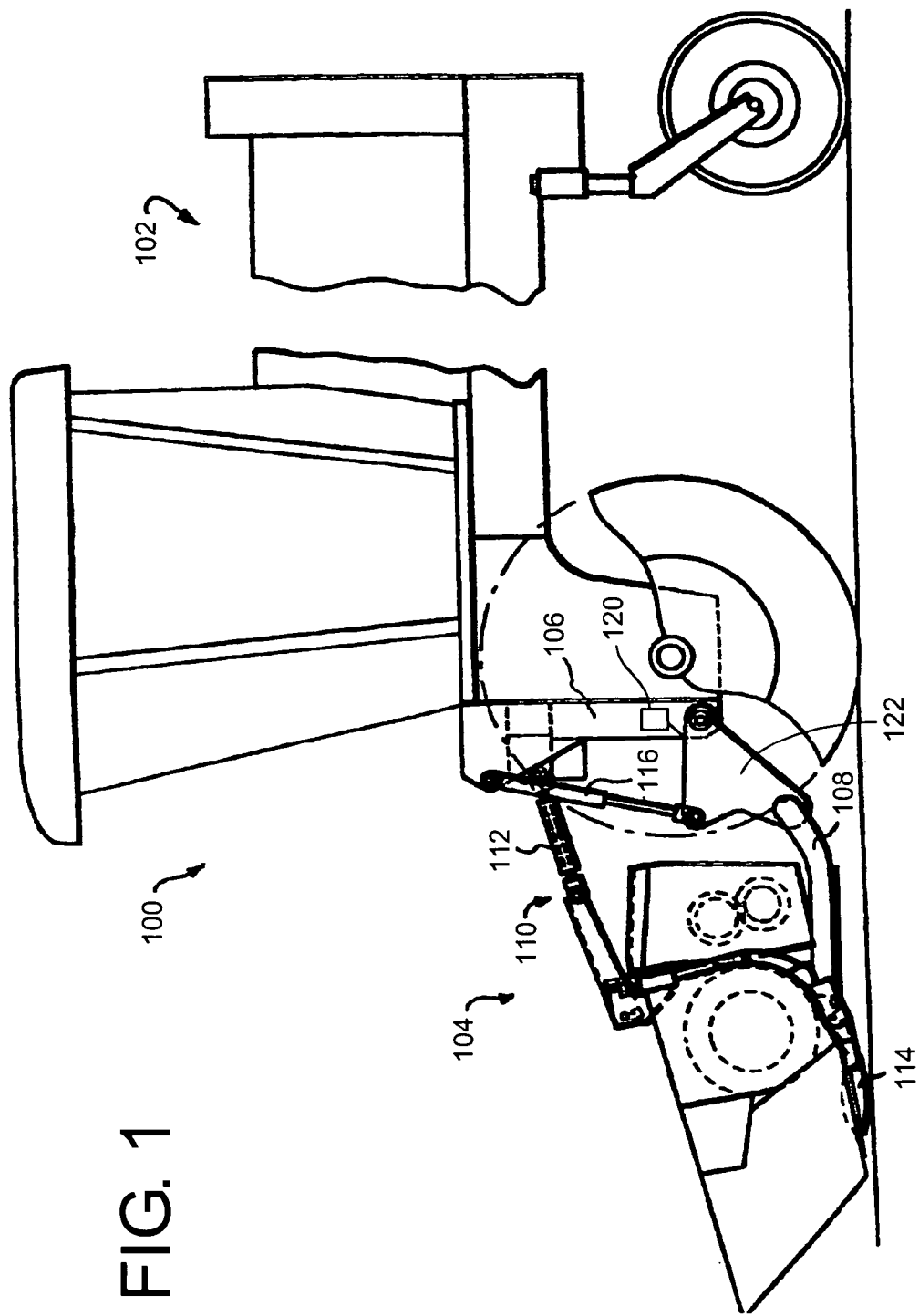
FIG. 1 is a side view of a vehicle having a header and a header flotation system in accordance with the present invention. In this embodiment, the vehicle is a windrower.

FIG. 1 shows the present invention utilized in connection with the self-propelled windrower 100, however, it will be appreciated that the principles of the present invention are not limited to a self-propelled windrower, or to any specific type of harvesting machine having a header. The figure shows windrower 100, which comprises a tractor 102 and a header 104. The header 104 is pivotally attached to the front end of the frame or chassis 106 of windrower 100 such that it can move up and down with respect to chassis 106.

Such attachment of the header 104 to the frame 106 is achieved through a pair of lower arms 108 (only the left one being shown, the right one being in the same position and in mirror configuration on the right side of the vehicle) pivoted at one end to the frame 106 and at the other end to the header 104 as well as through a central upper link 110.

The link 110 may take the form of a single double acting hydraulic cylinder 112 whose extension and retraction is controlled by the operator to remotely control the angle of sickle bar 114 on the lower front of the header 104.

Figure 2:
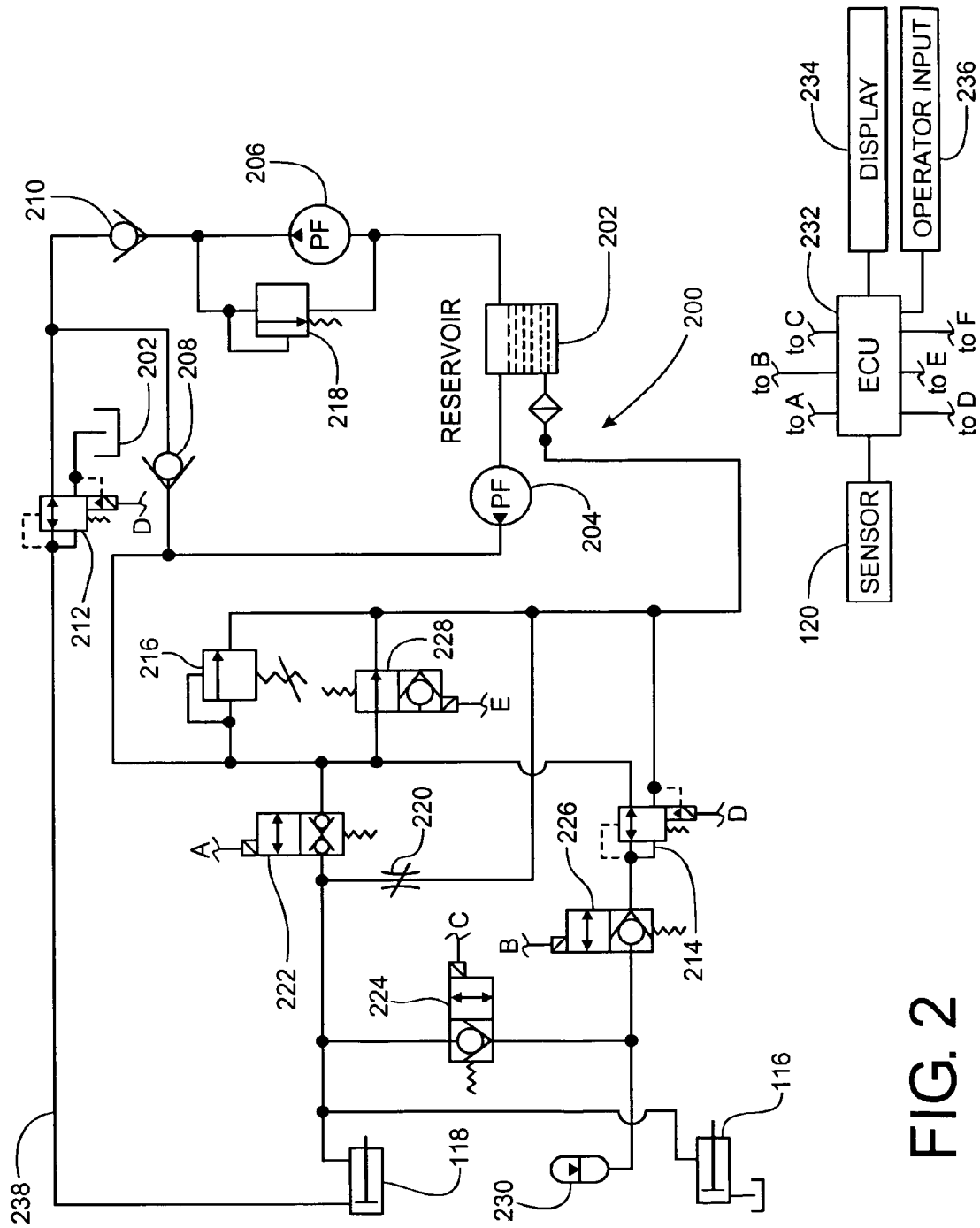
FIG. 2 is a schematic diagram of the hydraulic flotation system of the vehicle of FIG. 1.

A single lift/flotation cylinder 116 is shown in FIG. 1 interconnecting the lower arm 108 to the frame 106. Cylinder 116 supports each side of the header, i.e., each side of the header is supported by its own lift/flotation cylinder 116. Again, only the left side lift/flotation cylinder 116 is shown in FIG. 1. The right side lift/flotation cylinder 118 is not shown in FIG. 1, but is shown in FIG. 2. Right side lift/flotation cylinder 118 is identically constructed, configured, and arranged as left side lift/flotation cylinder 116 and is interconnected in the identical manner to the header and the frame but is configured in mirror image form to that of the left side of the vehicle.

A position sensor 120 is coupled to and between frame 106 and bell crank 122 and is configured to sense the relative position of bell crank 122 with respect to frame 106. The position sensor shown here is a potentiometer who's signal varies when the header moves up and down (has a vertical component of translation) with respect to frame 106. In the sense, the position sensor is also a height sensor. The particular arrangement of position sensor 120 with respect to frame 106 and with respect to bell crank 122 can be varied depending on the space available, the type transducer desired, and the resolution of the sensor.

FIG. 2 illustrates header flotation system 200, which includes reservoir 202; pumps 204 and 206; check valves 208 and 210; pressure reducing valves 212 and 214; pressure relief valves 216 and 218; adjustable needle valve 220, on/off/check valves 222, 224, 226, and 228, accumulator 230, electronic control unit (ECU) 232, display 234, operator input device 236, position sensor 120; and hydraulic cylinders 116, 118.

ECU 232 comprises a digital microcontroller. It is coupled to the coils of valves 212, 214, 222, 224, 226, and 228 to drive these valves. ECU 232 is coupled to electronic display 234 to provide the operator with information regarding the status of the vehicle. ECU 232 is coupled to operator input device 236 to receive from it a signal from the operator indicating a desired upforce to be applied to cylinders 116,118. ECU 232 is also coupled to position sensor 120 to receive from it a signal indicating the position of the header with respect to the ground.

ECU 232 comprises a pulse width modulated (PWM) driver circuit to drive valves 212, 214. Valves 212, 214 are proportional control valves that vary the valve output pressure proportional to the signal applied to them by the PWM driver circuit. Valves 222, 224, 226, and 228 are on/off valves.

ECU 232 further comprises CPU, RAM, ROM, and I/O circuits coupled together by a control/address/data bus. The I/O circuit includes the valve driver circuits (which include the PWM driver circuit), and signal conditioning circuits for processing the signals received from position sensor 120 and operator input device 236.

Hydraulic pumps 204, 206 are preferably gear pumps configured to provide hydraulic fluid under pressure to the other components of header flotation system 200. The pumps may be a part of the windrower itself (in the case of the self-propelled windrower with its own engine), or they may be disposed on a tractor or other vehicle that tows the windrower (or other implement having the header). When a windrower or implement with a header is towed by a tractor or other vehicle, a hydraulic pump on that vehicle may supply hydraulic fluid in place of pumps 204, 206. A hydraulic tank on that vehicle may receive hydraulic fluid in place of reservoir 202. Furthermore, one or all of the hydraulic components shown in the circuit of FIG. 2 may also be disposed on that vehicle, as well as the ECU 232 and other electronic components. In another configuration, all the hydraulic and electronic components shown in FIG. 2 except the position sensor 120 and the hydraulic flotation cylinders 116, 118 may be disposed on the tractor or other vehicle.

Valve 214 is a proportional control valve. It is configured to reduce the pressure of hydraulic fluid supplied to accumulator 230 and to the rod ends of cylinders 116, 118. Valve 214 receives hydraulic fluid under pressure from pump 204 and modulates this pressurized fluid proportional to a signal received from ECU 232. This fluid is applied to cylinders 116, 118 through valves 224 and 226.

By varying the signal applied to valve 214, ECU 232 is configured to vary the hydraulic fluid pressure in the accumulator and in the hydraulic cylinders. When ECU 232 increases the signal applied to valve 214, the pressure in accumulator 230 and in the rod end of hydraulic cylinders 116, 118 increases responsively. This increases the upforce applied by flotation cylinders 116, 118 to the header, which in turn reduces the net downforce of the header acting against the ground. Similarly, as the pressure decreases in accumulator 230 and in the rod ends of hydraulic cylinders 116, 118, a smaller upforce is applied to the header, which increases the net downforce of the header against the ground. This is the manner in which ECU 232 controls the net downforce of the header against the ground, which is discussed in greater detail below in conjunction with FIGS. 3 and 4.

Accumulator 230 has a relatively large fluid capacity compared to the capacity of hydraulic cylinders 116, 118. In practice, this means that cylinders 116, 118 can travel over their entire operating range with negligible increase or decrease in the pressure in accumulator 230. As a result, the upforce applied to header 104 by cylinders 116, 118 is an approximately linear function of the pressure in accumulator 230. ECU 232 is configured to energize valve 224 to permit bidirectional flow between accumulator 230 and cylinders 116, 118 during normal operation as the header floats with respect to the chassis of windrower 100. Furthermore, valve 214 responds to increases and decreases in pressure as the header rises and falls in flotation mode by conducting fluid to and from accumulator 230 and cylinders 116, 118 to maintain the pressure constant at whatever level is signaled to valve 214 by ECU 232.

The signal applied by ECU 232 to valve 214 is therefore proportional to the output pressure of valve 214, which is therefore equivalent to the pressure in accumulator 230, which is therefore proportional to the upforce applied by hydraulic cylinders 116, 118 on header 104 during normal operation with the header in flotation mode and valve 224 energized for bidirectional flow.

Valve 212, like valve 214, is a pressure reducing valve configured to regulate the pressure of hydraulic fluid at the head end of hydraulic cylinder 118. It receives hydraulic fluid from pump 206, and modulates the fluid pressure proportional to a signal received from ECU 232 to which it is coupled. The hydraulic fluid output from valve 212 is supplied to the head end of hydraulic cylinder 118 through hydraulic fluid conduit 238. ECU 232 is configured to selectively vary the pressure applied to the head end of cylinder 118 by varying the signal applied to the coil of valve 212.

ECU 232 is configured to independently vary the upforce applied by cylinder 118 to header 104 by varying the output pressure generated by valve 212. ECU 232 can vary the upforce applied to both hydraulic flotation cylinders 116, 118 simultaneously by varying the signal applied to valve 214. It can further tailor the upforce provided by hydraulic flotation cylinder 118 by varying the signal applied to valve 212. In this manner, ECU 232 can individually and independently control the upforce applied to both sides of the header.

In the preferred configuration, ECU 232 does not automatically vary the pressure applied by valve 212 to cylinder 118. Instead, ECU 232 receives an offset operator pressure (or force) request from operator input device 236, and responsively signals valve 212 to provide the requested pressure (or force). Operator input device 236 preferably includes a variable output device such as a potentiometer, shaft encoder, connected to a lever, knob, or similar device.

Figure 3:
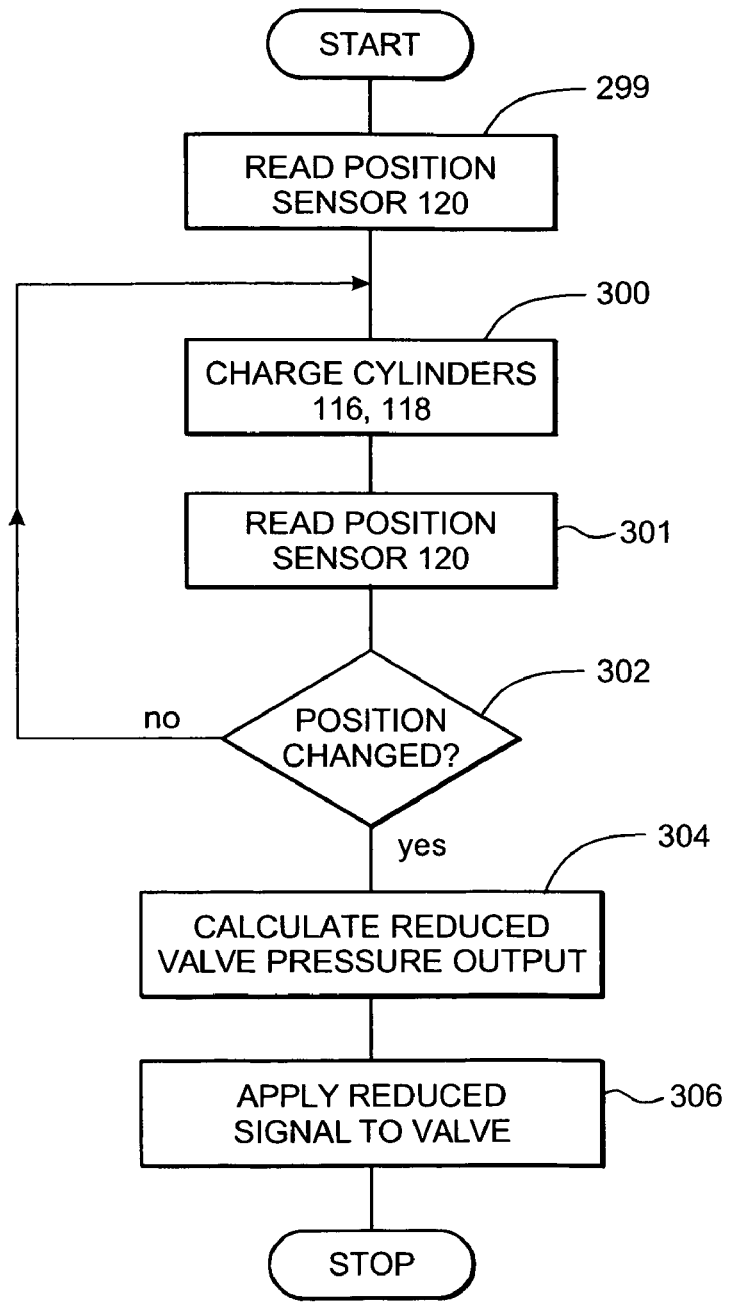
FIG. 3 is a flowchart of a first calibration process performed by the electronic control unit of FIG. 2.

FIG. 3 illustrates a first mode of operation in which ECU 232 calibrates the upforce provided by hydraulic cylinders 116, 118, to provide a desired net header downforce—the downforce applied by header 104 against the ground.

When the vehicle is initially started, the pressure in accumulator 230 and hydraulic cylinders 116, 118 is typically zero psi. The accumulator has been bled off and the hydraulic cylinders no longer counterbalance the front of the header. The header rests on the ground.

The operator requests the automatic calibration using an operator input device 236 such as a switch, dial, lever, touchscreen, mouse, button, voice command or other means for generating an operator command. Operator input device 236 transmits the request to ECU 232. In the preferred embodiment, the operator presses a button of operator input device 236 which signals ECU 232 to automatically execute the steps described in FIG. 3.

In step 299, the first of the calibration steps, ECU 232 responds to the operator requests by reading position sensor 120 to determine the resting height of the header. Typically, the header will be on the ground since this calibration step is most commonly performed at the beginning of the workday. Once ECU 232 reads the height, it saves it for further reference and continues to the next up in the process, step 300.

In step 300, ECU 232 charges accumulator 230 and cylinders 116, 118 a first incremental amount. ECU 232 signals valve 214 to apply an increasing hydraulic pressure on its output side in order to conduct hydraulic fluid under pressure from pump 204 to accumulator 230, and to cylinders 116, 118 through valves 226 and 224. Since the signal provided by ECU 232 is proportional to the pressure output from valve 214, ECU 232 is configured to begin by initially applying a relatively low signal to valve 214, thereby applying a relatively low pressure to the accumulator 230 and the hydraulic cylinders 116, 118.

In step 301, after sufficient time has passed to permit the header to rise in response to the incremental fill of cylinders 116, 118 in step 300, ECU again reads the position sensor 120.

In step 302, ECU 232 determines whether the height provided by the position sensor 120 has changed—i.e. whether the header has been lifted above the ground by the upforce provided by cylinders 116, 118—by comparing the original position read in step 299 with the position read in step 301.

If, in step 302, ECU 232 determines that the header has not been lifted above the ground, ECU 232 branches back to step 300 and incrementally increases the signal applied to valve 214. When the signal applied to valve 214 is incremented, valve 214 responsively increases the pressure applied to cylinders 116, 118 and to accumulator 230. Processing continues at step 214 where ECU 232 again reads the position sensor 120, and again determines in step 302 whether the header has lifted above the ground.

This process of incrementing the valve 214 signal (300), reading the height (301), and comparing the height (302) is repeated until ECU 232 senses that the header has risen in step 302, or until the signal (and hence the pressure) has been increased to a predetermined level that indicates an error has occurred. This predetermined level is one sufficiently high that the failure of the header to rise above the ground indicates that there is some problem. The problem may be, e.g., a broken signal line, broken sensor, broken valve, or weight resting on the header. When this occurs, ECU 232 is configured to reduce the signal applied to valve 214 to zero (i.e. zero output pressure from valve 214), and to signal the operator on display 234 that an error has occurred.

Once ECU 232 senses that the header has risen, the process branches to step 304, in which ECU 232 calculates a reduced pressure output of valve 214 that will generate the desired net downforce of the header against the ground.

To calculate this pressure, ECU 232 reads a signal generated by a force control of operator input device 236 that is configured to indicate a desired amount of force that the operator wishes the system to apply. In one embodiment, the desired force is the upforce applied by cylinders 116, 118 to the header. In the preferred embodiment, the desired force is the net downforce the operator wishes the header to apply to the ground. The force control of operator input device 236 preferably includes a variable output device such as a potentiometer, shaft encoder, connected to a lever, knob, or similar device.

In step 300-302 ECU 232 determined the valve signal necessary to lift the header off the ground. This is the signal that generates sufficient upforce to just counterbalance the weight of the header. In order to apply the desired downforce indicated by the force control of operator input device 236, ECU 232 reduces the signal applied to valve 214 an amount appropriate to generate the desired net downforce. In the preferred embodiment, ECU 232 has a lookup table stored in its digital memory (ECU 232 RAM or ROM memory) that correlates the desired downforce with the corresponding reduction in the signal applied to valve 214. For any desired downforce indicated by the force control ECU 232 looks up the corresponding reduction in valve 214 signal. Although a lookup table is preferred for faster processing, the value may be calculated using one or more equations stored as a sequence of instructions stored in the digital memory of ECU 232.

Once ECU 232 has calculated the valve 214 signal that will generate the operator's desired net downforce, ECU 232 then applies that reduce signal to valve 214 in step 306. The static calibration process is then complete.

Figure 4:
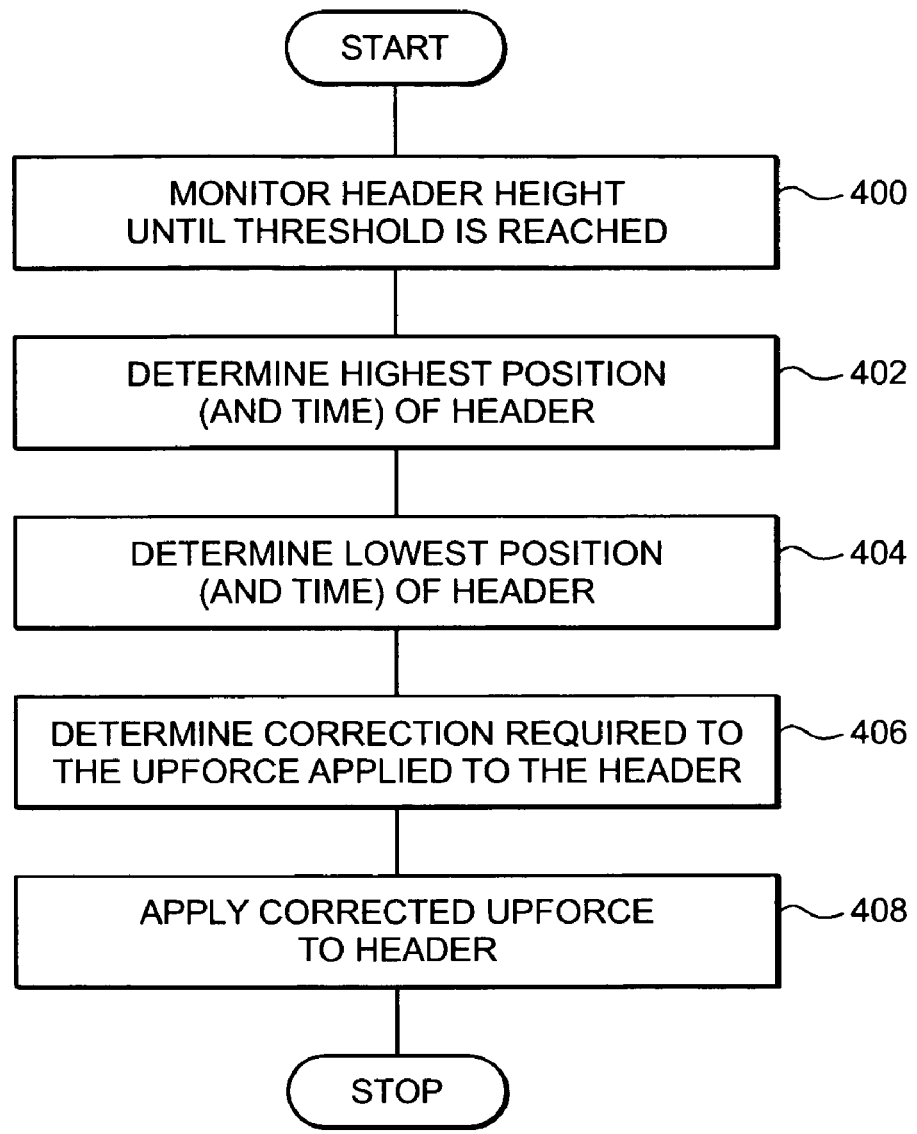
FIG. 4 is a flowchart of a second calibration process performed by the electronic control unit of FIG. 2.

FIG. 4 illustrates a second mode of operation comprising an alternative calibration process. This alternative calibration process is performed periodically and automatically in the field during harvesting to determine whether the weight of the header has changed during operation, typically due to the header gathering rocks, sticks, branches and other non-crop trash material.

As explained above, the operator may desire a net header downforce of only 50-100 pounds, yet trash may accumulate in the header during harvesting, thus increasing the net downforce of the header against the ground. This accumulated trash can weigh several hundred pounds, depending upon the type of windrower, the size of the header, and the plant matter and trash in the field in which the vehicle is operated.

This additional load in the header increases the net downforce of the header against the ground by an equal amount. It can substantially change the performance of the vehicle, causing the header to dig into the earth unnecessarily, loading increasing amounts of soil into the header, damaging the cutter bar on the header, and mixing trash in with the crop matter.

To compensate for this additional mass in the header, ECU 232 is configured to periodically and automatically determine the new downforce of the header against the ground.

The calibration process of FIG. 4 starts at step 400 in which ECU 232 monitors the header height using the position sensor to determine when the header rises above a threshold height. This threshold height is calculated, typically in advance, and is stored in the digital memory of ECU 232. The threshold height is selected sufficient to insure that the header will float down to the ground during calibration.

In this arrangement, the header is not artificially raised to the predetermined height, but occasionally reaches the predetermined height as the header bounces across the uneven surface of the ground during harvesting.

Whenever the header bounces up to this predetermined threshold height, ECU 232 senses this in step 400 and proceeds to the next step 402 in the calibration process.

In step 402, ECU 232 is configured to monitor the position sensor to determine when the header reaches its uppermost position, its peak height at which its upward velocity and vertical speed are zero. ECU 232 does this by repeatedly reading the position sensor 120 and comparing the position sensor signal value with previously read position sensor signal values. As long as the signals indicate that the header is still rising, ECU 232 keeps executing step 402. Once the header has reached its peak and begins to fall, however, the position indicated by the position sensor 120 will be lower than the previous sense that position. When this happens—when this peak position is reached—ECU 232 records the peak height and the time the header reached that height and continues with step 404. This recorded or stored height and time define a first position later used when calibrating the upforce applied to the header by the hydraulic cylinders.

In step 404, of the process, ECU 232 is configured to monitor the height sensor as the header falls from its highest position down toward the ground. ECU 232 does this by repeatedly reading the position sensor and comparing the position sensor signal values with previously read position sensor signal values. As long as this comparison indicates that the header is still falling, ECU 232 keeps executing step 404. Once the position sensor signal value indicates that the header is no longer falling (e.g. it has bounced off the ground and has started rising again) ECU 232 is configured to save the lowest header height and the time at which it reached that lowest height and continue processing with step 406. This height and time define a second position that is later used by ECU 232 when calibrating the upforce applied to the header by the hydraulic cylinders.

In an alternative configuration, ECU 232 does not have to wait until the header meets the ground and bounces back up, but can select an intermediate header position located between the peak height and the ground height of the header.

In step 406 of the process, ECU 232 is configured to determine the correction required to the upforce applied to the header that will maintain the desired net downforce, that will return the net downforce to its original value which was set in the process described in FIG. 3. ECU 232 does this by deriving the actual net downforce from the two header positions it previously recorded in steps 402 and 404 by using relationships derived from Newtonian equations of motion. From this ECU 232 calibrates the header flotation system, adjusting the upforce applied by flotation cylinders 116, 118 to counteract the added weight (and added downforce) of rocks and other trash that has accumulated in the header during harvesting.

With recorded data indicating two header positions, recorded data indicating the time required to fall between those positions (in this case, the difference between the two times at which the two heights were reached), and recorded data indicating the velocity of one of the two positions, as well as the initial upforce applied by flotation cylinders 116,118 to the header, ECU 232 is configured to determine the required increase in the upforce applied by cylinder 116, 118 necessary to counteract the additional weight of the header. It does this using relationships derived from equations of Newtonian motion provide below.

Equation 1 describes the relationship between the distance the header falls as a function of time, velocity, and acceleration.

$$y = vt - (at^2)/2 \qquad \text{Eqn. 1}$$

where "y" is the distance traveled by the header when it falls (i.e. the difference in height between the two recorded positions), "v" is the initial velocity of the header at its first position (i.e. zero), "t" is the time required to fall between the two recorded positions (i.e. the time difference between the two positions), and "a" is the constant acceleration of the header as it falls between the two positions. Using this relationship, and the position data previously recorded, ECU 232 is configured to determine the acceleration of the header as it falls between the two recorded positions.

Equation 2 describes the relationship between the forces acting upon the header, the mass of the header, the mass of the rocks and trash in the header that increase its weight, and the acceleration of the header with this additional weight. This equation is derived from the basic equation of Newtonian motion, F=ma, which indicates that the sum of the forces "F" acting upon a body of mass "m" makes that body accelerate with an acceleration "a".

$$(M+m)g - Fup = (M+m)a \qquad \text{Eqn. 2}$$

Where "M" is the original mass of the header (which is determined during the initial calibration process, or is stored in ECU 232), "m" is the mass of the rocks and other trash gathered into the header during operation, "g" is the gravitational constant (the acceleration due to gravity), "Fup" is the upforce exerted on the header by cylinders 116, 118, "a" is the acceleration of the header in free fall (Eqn. 1), and mg is the added downward force of the added rocks and trash. It is this added downforce "mg" that must be countered by and equal and opposite upforce generated by cylinders 116, 118.

ECU 232 is configured to determine this added down force (and hence the required additional upforce) using the relationships in Equation 2. Once the required correction has been calculated, ECU 232 proceeds to step 408.

In step 408, ECU 232 is configured to correct for the additional downforce (mg) by applying a corrected upforce to the header. ECU 232 does this by increasing the valve signal applied to valve 214 until the upforce exerted by cylinders 116, 118 on the header is increased by an amount equal to the downforce (mg) exerted by the added mass of rocks and trash on the header (which is equal to the additional downforce applied by the header to the ground). As explained above, the pressure provided by valve 214 is proportional to the signal applied to the valve. Thus, having determine the desired increase in upforce, ECU 232 increases the signal applied to valve 214 by a proportionate amount.

In this manner, ECU 232 calibrates the header flotation system by monitoring the motion of the header in freefall between two positions, calculating an increase in header downforce equal to rocks and trash in the header, and applying a counteracting and equal upforce. This maintains the net downforce of the header constant, which makes for a smoother ride over the field, reduced damage to the header and more consistent harvesting.

In the process described in FIG. 4, the header was raised to its first position by random collisions with the ground. In an alternative process quite similar to that of FIG. 4, rather than waiting for the header to bounce off the ground above the threshold height, the header is automatically calibrated whenever the operator raises the header upward for maneuvering clearance (typically in the headlands) and then is released.

In this variation on the FIG. 4 process, the operator raises the header using standard windrower controls. When the operator subsequently releases the header, permitting it to float (actually, permitting the header to fall gently to the ground, since there is a net downforce acting on the header) ECU 232 is configured to automatically execute steps 404-408 as described in FIG. 4, and thereby to calibrate the header flotation system.

This alternative process is typically performed when the windrower is in the headlands of a field being harvested. When turning the windrower in the headlands for a return harvesting pass through the agricultural field, the operator first lifts the header several inches above the ground, and above the threshold header height. Once he has turned the windrower around in the headlands and again approaches the field to harvest crop, he lowers the header (i.e. permits the header to float) and returns to harvesting. It is preferred that ECU 232 is programmed to perform this calibration whenever the operator raises the header above a threshold height.

From the foregoing it should be clear that a system and method for calibrating a header flotation system has been provided. It is capable of monitoring the position of the header, of determining positions of the header when it is released for flotation and falls toward the ground, of determining an increase in upforce necessary to counteract the weight of rocks and trash filling the header, and of driving a hydraulic valve and cylinder to apply the counteracting upforce to the header, thereby maintaining a constant downforce of the header against the ground.

It will be understood that changes in the details, materials, steps, and arrangements of parts which have been described and illustrated to explain the nature of the invention will occur to and may be made by those skilled in the art upon a reading of this disclosure within the principles and scope of the invention.

For example, two or more position sensors 120 may be coupled to ECU 232 to sense the position of the header at more than one location. These sensors may be disposed one on either side of the header. ECU 232 can be configured to calibrate two different downforces caused by rocks and trash acting on either side of the header by using the two sensors located on either side of the header, and can calculate two different upforces to be applied to either side of the header. ECU 232 can be configured to provide these two different upforces on either side of the header by varying the signals applied to valves 212 and 214, thereby independently providing each of cylinders 116, 118 with a different upforce tailored to compensate for their different amounts of rocks and trash.

In another alternative arrangement, the entire circuit (including components 202, 206, 208, 210, 212) that supplies pressure to the piston end of cylinder 118 can be eliminated. This would be beneficial in cases in which the mass of the header is evenly distributed in a lateral direction and thus has an evenly distributed downforce across its entire length.

In yet another alternative arrangement, each cylinder 116, 118 can be provided with its own individual circuit 200, instead of coupling both of cylinders 116, 118 to a common circuit 200. Each cylinder 116, 118, would therefore have its own control valve 214 and accumulator 230 permitting ECU 232 to set a separate upforce tailored to each cylinder. Each cylinder would be separately controlled by its own circuit 200 (preferably without components 202, 206, 208, 210, 212). These separate circuits would preferably use the same ECU 232 to control and calibrate both hydraulic control circuits.

As shown herein, an electronic control unit (ECU 232) is preferably used to calibrate the flotation system. Alternatively, a hydraulic, pneumatic, or combined hydraulic/pneumatic control circuit that provides substantially the same calibration functions as ECU 232 can be used in place of ECU 232.

As yet another alternative arrangement, sensor 120 may be a hydraulic, pneumatic, or electrical device. It may be a rotary device responsive to relative rotary motion, or a linear device responsive to relative linear motion. It may operate based on changes in fluid or liquid pressure or the presence or absence of electromagnetic field to radiation. It may include, without limitation, such devices as potentiometers, shaft encoders, linear encoders, proximity switches, pressure switches, radiation sensors, flow sensors, or the like.

Furthermore, the embodiment described herein used equations of motions appropriate for a header that floats in a vertical (or almost vertical) direction. Other headers, due to the particular geometry of the header/vehicle coupling may fall vertically and move laterally as well. The equations of motions for these vehicles would be different than those above in order to accommodate the non-vertical components of header movement. Furthermore, it may be necessary to use multiple equations of motion to fully describe the movement of the header over its entire range of flotation.

Even further, the way in which the hydraulic floatation cylinder is coupled to the header may require the use of different equations of motion as well. For example, the configuration of the hydraulic floatation cylinder and its linkage to the header may provide an applied upforce on the header that is not constant over the entire range of header movement. In this case, the equations used to determine the upforce applied by the hydraulic flotation cylinders would be different than those above in order to accommodate the nonlinear application of force to the header as a function of distance. Furthermore, it may be necessary to use multiple equations of motion to fully describe the force applied by the hydraulic flotation cylinders to the header over its entire range of motion.

The foregoing description illustrates in the preferred embodiment of the invention; however, concepts, as based upon the description, may be employed in other embodiments without departing from the scope of the invention. Accordingly, the following claims are intended to protect the invention broadly as well as in the specific form shown.

I claim:

1. A system for calibrating a header flotation system of an agricultural vehicle having a header, the header flotation system configured to manage a downforce of the header against the ground, the system comprising:
    a controller configured to a) monitor the position of the header as the header is propelled across the ground and floats in a flotation mode, b) determine an acceleration value of the header as it moves between two positions while in the flotation mode, c) calculate a change in the header weight based on the acceleration value, and d) calibrate the header flotation system by calculating a revised upforce signal configured to maintain constant a predetermined downforce of the header against the ground based upon the change in the calculated weight of the header while in the flotation mode.

2. The system of claim 1, further comprising a hydraulic actuator configured to apply an upforce to the header, wherein the controller is configured to maintain the predetermined downforce by varying the upforce applied by the hydraulic actuator.

3. The system of claim 2, further comprising a hydraulic control valve coupled to the controller and to the hydraulic actuator, and further wherein the controller applies the revised upforce signal to the hydraulic control valve.

4. The system of claim 1, wherein the controller is configured to increase an upforce on the header until a change in position of the header is detected, and then to reduce the upforce until the header applies the predetermined downforce to the ground.

5. The system of claim 1, wherein the controller calculates the revised upforce signal when the header is manually released by the operator.

6. A computer-implemented method of calibrating a header flotation system of an agricultural vehicle having a header that floats among several positions, comprising the steps of:
    electronically monitoring the header position while the header is propelled across the ground and operating in a flotation mode;
    recording an uppermost position reached by the header and a time at which the uppermost position was reached;
    recording a lowermost position reached by the header and a time at which the lowermost position was reached;
    determining an acceleration value of the header as it moves between the uppermost and lowermost positions while in the flotation mode;
    electronically calculating a change in the header weight based on the acceleration value; and
    electronically calibrating the header flotation system by calculating a revised upforce signal that will maintain a predetermined downforce of the header against the ground based upon detection of movement of the header between the uppermost position and the lowermost position of the header via a position sensor and determination of changes in the header weight while in the flotation mode.

7. The method of claim 6 wherein the step of electronically calculating includes the steps of:
    determining a desired increase in upforce to be applied to the header based upon the acceleration of the header between the first and second positions of the header;
    calculating the revised upforce signal based upon the desired increase in upforce; and
    applying the revised upforce signal to a hydraulic control valve coupled to a header-lifting hydraulic actuator.

8. The method of claim 6, further comprising the step of:
    electronically and incrementally increasing an upforce applied to the header while electronically monitoring the position of the header in a flotation mode.

9. The method of claim 8, further comprising the steps of:
    electronically detecting an upward movement of the header as the revised upforce signal is applied; and
    reducing the upforce applied to the header when upward movement is detected until the header has a desired predetermined downforce against the ground.

* * * * *